3,050,487
REDUCING STICKINESS DURING THE MILLING OF A RUBBERY DIENE POLYMER BY ADDITION OF A HYDROCARBON ACID ESTER OF A PHOSPHORIC ACID
Paul W. Solomon, Bartlesville, Okla., assignor to Phillips Petroleum Company, a corporation of Delaware
No Drawing. Filed Mar. 7, 1958, Ser. No. 719,712
12 Claims. (Cl. 260—30.6)

This invention relates to acid phosphates as processing aids in carboxy-containing rubber.

Carboxy-containing rubbers (rubbers containing —COOH groups attached to carbon atoms in the polymer) exhibit many desirable properties and they have been considered for specialized application where these properties are desired. However, the production and handling of such rubbers, as exemplified by copolymers of butadiene and acrylic acid, is difficult because of the tendency of such copolymers to adhere to mill rolls during compounding, especially where the monomer mixture contains more than five percent of the carboxy-containing monomer. In fact, this stickiness is so great that the polymer must be scraped from the mill rolls in small pieces. This is a difficult and time consuming operation.

The following are objects of my invention.

An object of my invention is to improve the method of processing carboxy-containing rubber. A further object of my invention is to improve the processing of butadiene/acrylic acid copolymers. A further object of my invention is to provide a method of milling carboxy-containing rubber by which the rubber containing compounding ingredients can be easily milled and easily removed from the mill rolls.

Other objects and advantages of my invention will be apparent to one skilled in the art upon reading this disclosure.

Broadly, my invention is based upon the discovery that rubbery polymers prepared by polymerizing a major portion of a conjugated diene containing 4 to 8 carbon atoms and a minor portion of a copolymerizable monocarboxylic or discarboxylic acid can be milled without difficult adhesion to mill rolls by adding a small amount of a hydrocarbon acid ester of a phosphoric acid containing from 1 to 4 phosphorus atoms. By hydrocarbon acid ester I include esters of phosphoric acids in which at least one of the acid hydrogen atoms remains unsubstituted and at least one of the acid hydrogen atoms is replaced by a hydrocarbon group containing no aliphatic unsaturation. Obviously, mixtures of these acid phosphates, as hereinafter more fully set forth, can be used. The acid phosphates are preferably added after the rubbery copolymer has been recovered and prior to the addition of additional compounding ingredients. Generally, it is the first material added to the copolymer after the copolymer has been placed on the mill.

Esters of phosphoric acids which are applicable in this invention include esters of otho-, polymeta-, and polyorthophosphoric acids in which at least one of the acid hydrogen atoms remains unsubstituted. The remaining acid hydrogen atoms are replaced by alkyl, aryl, aralkyl, alkaryl, or cycloalkyl radicals. Also included are the esters of dimeta- $(HPO_3)_2$, trimeta- $(HPO_3)_3$, tetrameta- $(HPO_3)_4$, pyro- $(H_4P_2O_7)$, triortho- $(H_5P_3O_{10})$, and tetraorthophosphoric $(H_6P_4O_{13})$ acids. These acids are described in "A Comprehensive Treatise on Inorganic and Theoretical Chemistry," by J. W. Mellor, volume VIII, pages 984 and 990, Longmans, Green and Company, 1931. Esters of metaphosphoric acid $(HPO_3)$ are not applicable as they do not fulfill the requirement of containing an acid hydrogen atom. The number of carbon atoms in each organic radical generally does not exceed 20 and the total number of carbon atoms in the molecule generally does not exceed 60. The use of esters containing larger organic substituents and more than 60 carbon atoms per molecule is considered within the scope of this invention should it be deemed advantageous to employ such compounds in specific instances where desirable effects are achieved through their use.

Specific examples of esters of phosphoric acids which are applicable in this invention include ethyl lauryl acid orthophosphate, diethyl acid orthophosphate, dimethyl acid orthophosphate, phenyl diacid orthophosphate, n-propyl diacid orthophosphate, dibenzyl acid orthophosphate, n-butyl tolyl acid orthophosphate, phenyl n-butyl acid orthophosphate, ethyl benzyl acid orthophosphate, cyclohexyl acid orthophosphate, diisoamyl acid orthophosphate, ethyl cyclohexyl acid orthophosphate, methyl benzyl acid orthophosphate, octyl tolyl acid orthophosphate, propyl nonyl acid orthophosphate, decyl diacid orthophosphate, didecyl acid orthophosphate, dodecyl diacid orthophosphate, didodecyl acid orthophosphate, methyl dodecyl acid orthophosphate, dieicosyl acid orthophosphate, diisopropyl acid orthophosphate, di-n-propyl acid pyrophosphate, diisoamyl acid pyrophosphate, dioctyl acid pyrophosphate, triethyl acid pyrophosphate, tetramethyl acid triorthophosphate, dibutyl acid triorthophosphate, pentaisoamyl acid triorthophosphate, pentaoctyl acid triorthophosphate, tridecyl acid tetraorthophosphate, trihexadecyl acid tetraorthophosphate, trieicosyl acid pyrophosphate, tetra(pentadecyl) acid triorthophosphate, penta(dodecyl) acid tetraorthophosphate, tetraoctyl diacid tetraorthophosphate, pentaethyl acid tetraorthophosphate, n-butyl acid dimetaphosphate, triisopropyl acid trimetaphosphate, dinonyl diacid tetrametaphosphate, decyl diacid trimetaphosphate, and trieicosyl acid tetrametaphosphate.

Stickiness during milling in rubbers containing a multiplicity of carboxy groups can be alleviated by the incorporation of acid hydrogen-containing esters of phosphoric acids as hereinbefore described. The amount of ester required to provide easy milling of the rubber will depend, at least in part, upon the carboxy content of the rubber as well as upon the phosphoric acid ester employed. Some esters are more effective in certain carboxy-containing rubbers than are others. Ethyl lauryl acid orthophosphate, for example, is more effective in a butadiene/acrylic acid rubber than is diethyl acid orthophosphate. Generally, for a butadiene/acrylic acid rubber prepared from a monomer mixture containing five weight percent or more of acrylic acid, at least one part of an alkyl acid phosphate per 100 parts of rubber is required to alleviate stickiness, and preferably at least two parts is employed. In many instances easy milling with no sticking to the mill rolls is achieved by the addition of 2–4 parts by weight of an alkyl or aryl acid phosphate per 100 parts of a carboxy containing rubber. The additional improvement obtained by the use of more than 5 parts by weight as far as mill roll adhesion is concerned is very slight.

While carboxy containing rubbers can generally be rendered easy milling by the incorporation of relatively small quantities of the phosphoric acid esters herein described, much larger quantities of these esters can be employed if desired. Many of the esters of phosphoric acids have a plasticizing action on rubber and in this invention they can perform the dual function of milling or processing aids and plasticizers. When employed in the latter capacity, larger quantities will be used than would otherwise be necessary if a different type of plasticizer were chosen. It is to be understood that individual esters or mixtures can be used as processing aids or as processing aids and plasticizers, and also that one or more esters can be used along with one or more other types of plasticizers so long as the materials are compatible with each other and with the rubber. The amount of a particular plasticizer used, as is known in the art, will be determined by the type of rubber being processed as well as by the properties desired in the finished product. Thus, where this combination effect is desired, it is possible to use an additional 5 to 50 parts of the phosphate ester.

While the rubbery materials most frequently employed are copolymers of conjugated dienes with acidic monomers such as acrylic and methacrylic acids, rubbers prepared by the copolymerization of conjugated dienes with other acidic monomers can also be used. Generally, the acidic monomer does not contain more than 12 carbon atoms. Examples of such acidic monomers include crotonic acid, 2-methyl-2-butenoic acid, 2-pentenoic acid, 2-ethyl-2-pentenoic acid, 2-hexenoic acid, 5-methyl-2-hexenoic acid, 2-octenoic acid, 2-decenoic acid, 2-undecenoic acid and dodecenoic acid; phenylacrylic acids, i.e., atropic and cinnamic acids; and 2,4-pentadienoic acid. Unsaturated dicarboxylic acids such as fumaric, maleic, itaconic, teraconic, and citraconic acids are also applicable. Mixtures of these acids can be used.

Suitable conjugated dienes are those copolymerizable with the carboxylic acids and which, preferably, contain 4 to 8 carbon atoms. The simplest, and most readily available, member of this group is 1,3-butadiene. Other dienes include isoprene, 2,3-dimethylbutadiene, 2-methyl-1,3-hexadiene, and 1,3-octadiene. Mixtures can be used. Small amounts of one or more other copolymerizable monomers can also be incorporated in the polymer. Examples of these monomers include styrene, acrylonitrile, methyl vinyl ether, and the like.

The following examples illustrate specific embodiments of my invention, the acid orthophosphates having been obtained from Victor Chemical Company. They should not be considered unduly limiting. These examples show that standard compounding recipes can be used, including the usual pigments, fillers and reinforcing agents. Recipe 2 of Example II is especially interesting in illustrating the use of metal powder in the product.

*Example I*

Butadiene was copolymerized with acrylic acid using variable monomer ratios. Polymerization was effected in aqueous emulsion at 41° F. in accordance with the following basic recipe:

|  | Parts by weight |
|---|---|
| Water | 200 |
| Butadiene | Variable |
| Acrylic acid | Variable |
| Duponol ME [1] | 8 |
| Daxad 11 [2] | 0.4 |
| $FeSO_4 \cdot 7H_2O$ | 0.02 |
| Sequestrene AA [3] | 0.04 |
| Sodium formaldehyde sulfoxylate | 0.08 |
| p-Menthane hydroperoxide | 0.08 |
| Tert-dodecyl mercaptan | Variable |

[1] Sodium lauryl sulfate.
[2] Sodium salt of condensed alkyl aryl sulfonic acid.
[3] Ethylene diamine tetraacetic acid.

The shortstop employed was a mixture of 0.2 part by weight of Thiostop N (sodium dimethyldithiocarbamate) and 0.1 part by weight of di-tert-butylhydroquinone. Phenyl-beta-naphthylamine, 1.5 part by weight per 100 parts rubber, was employed as the antioxidant.

Polymerization data are shown below:

| Run No. | Butadiene/acrylic acid monomer ratio | Conversion percent | Time, hours | Tert-dodecyl mercaptan, parts | Mooney value, ML-4 |
|---|---|---|---|---|---|
| 1 [1] | 95/5 | 59 | 15.5 | 0.46 | 21 |
| 2 [1] | 90/10 | 59.2 | 15.0 | 0.46 | 26 |
| 3 | 85/15 | 56.6 | 11.5 | 0.50 | 16 |
| 4 | 85/15 | 60.8 | 11.2 | 0.46 | 60 |
| 5 | 80/20 | 57.7 | 10.5 | 0.50 | 38 |

[1] 5 part methanol rinse.

Masterbatches were prepared on the mill from each of the butadiene/acrylic acid rubbers by mixing 100 parts by weight of rubber, 50 parts by weight of a special furnace-type high abrasion carbon black (Philblack O), and 10 parts by weight of a mixture containing equal parts of Circosol-2XH with ParaFlux. (Circosol-2XH is a petroleum hydrocarbon softener, containing hydrocarbons of high molecular weight, in the form of a heavy, viscous, transparent, pale green, odorless liquid of low volatility; specific gravity 0.940; Saybolt Universal viscosity at 100° F., about 2000 seconds. ParaFlux is a saturated polymerized hydrocarbon.) The masterbatches were difficult to prepare because the rubber adhered to the mill rolls.

Ethyl lauryl acid phosphate was incorporated in variable quantities, by mill mixing, into each of the masterbatches and milling characteristics were observed. Results were as follows:

| Run No. | Butadiene/acrylic acid ratio | ML-4 212° F. | Ethyl lauryl acid phosphate, phr.[1] | Milling observations |
|---|---|---|---|---|
| 1 | 95/5 | 21 | 0 | Extremely sticky; adhered tenaciously to mill rolls; scraped off mill in small pieces. |
|  |  |  | 1 | Sticky; came off mill roll in large pieces. |
|  |  |  | 2 | Easy milling; very slightly sticky. |
| 2 | 90/10 | 26 | 0 | Extremely sticky; adhered tenaciously to mill rolls; scraped off mill in small pieces. |
|  |  |  | 1 | Do. |
|  |  |  | 2 | Sticky; came off mill in one piece. |
|  |  |  | 3 | Easy milling; very slightly sticky. |
| 3 | 85/15 | 16 | 0 | Extremely sticky; adhered tenaciously to mill rolls; scraped off mill in small pieces. |
|  |  |  | 1 | Do. |
|  |  |  | 2 | Sticky; came off mill in one piece. |
|  |  |  | 3 | Easy milling; very slightly sticky. |
| 4 | 85/15 | 60 | 0 | Extremely sticky, scraped off mill in small pieces; tough. |
|  |  |  | 1 | Sticky; came off mill roll in large pieces. |
|  |  |  | 2 | Slightly sticky; fair milling. |
|  |  |  | 3 | Very easy milling; not sticky. |
| 5 | 80/20 | 38 | 0 | Stickiest of all the samples; scraped off mill in small pieces. |
|  |  |  | 1 | Scraped off mill in small pieces. |
|  |  |  | 2 | Sticky; came off mill in one piece. |
|  |  |  | 3 | Slightly sticky; fairly easy milling. |
|  |  |  | 4 | Very easy milling; not sticky. |

[1] Parts by weight per 100 parts rubber.

The stocks containing less than 2 parts ethyl lauryl acid phosphate were too sticky for satisfactory milling. Those containing from 2–4 parts of the phosphate that were easy milling were compounded in accordance with the following recipe:

|  | Parts by weight |
|---|---|
| Rubber-carbon black-Circo Para masterbatch | 160 |
| Ethyl lauryl acid phosphate | Variable |
| Zinc oxide | 1.2 |
| Stearic acid | 2.8 |
| Flexamine [1] | 1.0 |
| Sulfur | 1.75 |
| Santocure [2] | 1.0 |

[1] Physical mixture containing 65 percent of a complex diarylaminoketone reaction product and 35 percent of N,N'-diphenyl-p-phenylenediamine.
[2] N-cyclohexyl-2-benzothiazylsulfenamide.

The stocks were milled, cured 30 minutes at 307° F.

and physical properties determined. Results were as follows:

| | Rubber | | | | |
|---|---|---|---|---|---|
| | 1 | 2 | 3 | 4 | 5 |
| Butadiene/acrylic acid ratio | 95/5 | 90/10 | 85/15 | 85/15 | 80/20 |
| Raw Mooney, ML-4 | 21 | 26 | 16 | 60 | 38 |
| Ethyl lauryl acid phosphate, phr | 2 | 3 | 3 | 3 | 4 |
| Unaged Samples: | | | | | |
| Compression set, percent | 14.8 | 24.8 | 24.1 | 19.5 | 29.4 |
| 300% modulus, p.s.i., 80° F | 1,750 | 2,390 | 1,670 | 2,070 | 1,870 |
| Tensile, p.s.i., 80° F | 2,590 | 2,650 | 2,480 | 4,200 | 3,650 |
| Elongation, percent 80° F | 400 | 320 | 410 | 470 | 470 |
| ΔT F | 62.5 | 66.9 | 69.3 | 58.1 | 70.9 |
| Resilience, percent | 61.9 | 60.2 | 58.1 | 62.6 | 55.5 |
| Shore hardness | 64.5 | 60 | 61 | 62 | 63 |
| Oven aged 24 hours at 212° F.: | | | | | |
| Tensile, p.s.i., 80° F | 2,370 | 2,630 | 2,480 | 3,075 | 3,470 |
| Elongation, percent, 80° F | 225 | 175 | 230 | 240 | 250 |

*Example II*

Aluminum dust and high abrasion furnace black were employed as reinforcing agents in the butadiene/acrylic acid rubber described in run 4 of Example I. The rubber was a Mooney (ML-4) 85/15 butadiene/acrylic acid copolymer (contained 13.1 weight percent acrylic acid). Compounding recipes were as follows:

| | Parts by weight | |
|---|---|---|
| | 1 | 2 |
| Butadiene/acrylic acid rubber | 100 | 100 |
| Furnace black (Philblack O) | 50 | |
| Aluminum dust | | 75 |
| Zinc oxide | 1.2 | 1.2 |
| Stearic acid | 2.8 | 2.8 |
| Flexamine [1] | 1 | 1 |
| Circo-Para [1] | 10 | 10 |
| Sulfur | 1.75 | 1.75 |
| Santocure [1] | 1.0 | 1.0 |
| Ethyl lauryl acid phosphate | 2-4 | 2-4 |

[1] As in Example I.

In each case the ethyl lauryl acid phosphate was incorporated into the rubber before any other compounding ingredients were added. Increasing the phosphate level from 2 to 4 phr. had little effect on the physical properties of the stocks but those containing the higher level of phosphate handled easier on the mill.

The stocks were milled, cured 30 minutes at 307° F., and physical properties determined. Results were as follows:

| | Compounding recipe | | | |
|---|---|---|---|---|
| | 1 | | 2 | |
| Ethyl lauryl acid phosphate, phr | 2 | 4 | 2 | 4 |
| Philblack O, phr | 50 | 50 | | |
| Aluminum dust, phr | | | 75 | 75 |
| Compression set, percent | 15.3 | 19.2 | 16.2 | 32.8 |
| 300% modulus, p.s.i., 80° F | 1,770 | 1,610 | 2,120 | 1,970 |
| Tensile, p.s.i., 80° F | 3,450 | 3,590 | 2,200 | 1,970 |
| Elongation, percent, 80° F | 475 | 540 | 340 | 300 |
| ΔT F | 60.2 | 64.2 | 55.8 | (¹) |
| Resilience, percent | 62.6 | 61.1 | 74.8 | 73.4 |
| Shore hardness | 64 | 63 | 84 | 89 |
| Oven aged 24 hours at 212° F.: | | | | |
| Tensile, p.s.i., 80° F | 3,430 | 3,270 | 2,070 | 1,940 |
| Elongation, percent, 80° F | 300 | 310 | 110 | 120 |

[1] Pellet split.

*Example III*

The butadiene/acrylic acid rubber described in run 4 of Example I was employed for the production of two large masterbatches containing the following ingredients:

| | Parts by weight | |
|---|---|---|
| | 1 | 2 |
| Butadiene/acrylic acid rubber | 600 | 600 |
| Philblack O | 300 | 300 |
| Circosol-2XH-ParaFlux | 60 | 60 |
| Ethyl lauryl acid phosphate | | 18 |

The two stocks were milled on a 6″ by 12″ mill having steel rolls (cold water circulating). Stock 1 became extremely sticky as the black and softener were incorporated and could not be taken off the rolls except by scraping. Three phr. of the phosphate was added to it. As soon as this compound had been dispersed and reached the surface of the mill rolls, the stock handled very easily. Milling of stock 2 was easy.

These data show that ethyl lauryl acid phosphate functions as a processing aid to alleviate stickiness in butadiene/acrylic acid rubber regardless of batch size and temperature during milling.

*Example IV*

The sodium salt of ethyl lauryl acid phosphate was prepared by adding alcoholic NaOH to an alcohol solution of the phosphate to a faint pink phenolphthalein color. The alcohol and water were allowed to evaporate at room temperature. Three phr. of this material was examined as a processing aid in the butadiene/acrylic acid rubber described in run 4 of Example I (50 phr. of Philblack O and 10 phr. of Circosol-2XH-ParaFlux as in Example I). The milling characteristics appeared slightly better at first run than when no phosphate was present but when the stock became warm, it became very sticky and adhered to the mill rolls. It could be removed after the rolls were allowed to cool.

When 3 phr. of ethyl lauryl acid phosphate was used instead of the sodium salt, the rubber was easily milled and was not at all sticky (see Example I).

*Example V*

Three parts of diethyl acid phosphate was tried as an aid in alleviating the stickiness during milling of the butadiene/acrylic acid rubber described in run 4 in Example I (50 phr. of Philblack O and 10 phr. of Circosol-2XH-Paraflux as in Example I). A marked improvement in milling characteristics was observed in both hot and cold rubber over a similar composition in which no diethyl acid phosphate was present.

As many possible embodiments can be made of this invention without departing from the scope thereof, it is to be understood that all matter herein set forth is to be interpreted as illustrative and not as unduly limiting the invention.

I claim:
1. A process of reducing sticking during milling which comprises milling a rubbery diene polymer prepared by polymerizing a major portion of a conjugated diene containing 4 to 8 carbon atoms and a minor portion of an acid containing not more than 12 carbon atoms selected from the group consisting of ethylenically unsaturated copolymerizable monocarboxylic and dicarboxylic acids, said milling being carried out in the presence of a small amount of a hydrocarbon acid ester of a phosphoric acid containing 1 to 4 pentavalent phosphorus atoms.

2. A process of reducing sticking during milling which comprises milling a rubbery diene polymer prepared by polymerizing a major portion of a conjugated diene containing 4 to 8 carbon atoms and a minor portion of an acid containing not more than 12 carbon atoms selected from the group consisting of ethylenically unsaturated copolymerizable monocarboxylic and dicarboxylic acids, said milling being carried out in the presence of a small amount of ethyl lauryl acid orthophosphate.

3. A process of reducing sticking during milling which comprises milling a rubbery diene polymer prepared by polymerizing a major proportion of 1,3-butadiene and a minor portion of acrylic acid comprising carrying out said milling in the presence of a small amount of a hydrocarbon acid ester of a phosphoric acid containing from 1 to 4 pentavalent phosphorus atoms.

4. A process for reducing sticking during milling of rubbery diene polymers prepared by polymerizing, based on 100 parts of monomers, 95 to 80 parts by weight of 1,3-butadiene and 5 to 20 parts of acrylic acid, said milling being carried out in the presence of 1 to 5 parts by weight of ethyl lauryl acid orthophosphate based upon 100 parts by weight of said polymer.

5. A process for reducing sticking during milling of rubbery diene polymers prepared by polymerizing, based on 100 parts of monomers, 95 to 80 parts by weight of 1,3-butadiene and 5 to 20 parts of methacrylic acid, said milling being carried out in the presence of 1 to 5 parts by weight of ethyl lauryl acid orthophosphate based upon 100 parts by weight of said polymer.

6. A process for reducing sticking during milling of rubbery diene polymers prepared by polymerizing, based on 100 parts of monomers, 95 to 80 parts by weight of 1,3-butadiene and 5 to 20 parts of ethacrylic acid, said milling being carried out in the presence of 1 to 5 parts by weight of ethyl lauryl acid orthophosphate based upon 100 parts by weight of said polymer.

7. A process for reducing sticking during milling of rubbery diene polymers prepared by polymerizing, based on 100 parts of monomers, 95 to 80 parts by weight of 1,3-butadiene and 5 to 20 parts of phenylacrylic acid, said milling being carried out in the presence of 1 to 5 parts by weight of ethyl lauryl acid orthophosphate based upon 100 parts by weight of said polymer.

8. A process for reducing sticking during milling of rubbery diene polymers prepared by polymerizing, based on 100 parts of monomers, 95 to 80 parts by weight of 1,3-butadiene and 5 to 20 parts of maleic acid, said milling being carried out in the presence of 1 to 5 parts by weight of ethyl lauryl acid orthophosphate based upon 100 parts by weight of said polymer.

9. A process for reducing sticking during milling of rubbery diene polymers prepared by polymerizing, based on 100 parts of monomers, 95 to 80 parts by weight of 1,3-butadiene and 5 to 20 parts of acrylic acid, said milling being carried out in the presence of 1 to 5 parts by weight of diethyl acid orthophosphate based upon 100 parts by weight of said polymer.

10. A process for reducing sticking during milling of rubbery diene polymers prepared by polymerizing, based on 100 parts of monomers, 95 to 80 parts by weight of 1,3-butadiene and 5 to 20 parts of acrylic acid, said milling being carried out in the presence of 1 to 5 parts by weight of dimethyl acid orthophosphate based upon 100 parts by weight of said polymer.

11. A process for reducing sticking during milling of rubbery diene polymers prepared by polymerizing, based on 100 parts of monomers, 95 to 80 parts by weight of 1,3-butadiene and 5 to 20 parts of acrylic acid, said milling being carried out in the presence of 1 to 5 parts by weight of dioctyl acid pyrophosphate based upon 100 parts by weight of said polymer.

12. A process for reducing sticking during milling of rubbery diene polymers prepared by polymerizing, based on 100 parts of monomers, 95 to 80 parts by weight of 1,3-butadiene and 5 to 20 parts of acrylic acid, said milling being carried out in the presence of 1 to 5 parts by weight of dibutyl acid triorthophosphate based upon 100 parts by weight of said polymer.

References Cited in the file of this patent

UNITED STATES PATENTS

| | | |
|---|---|---|
| 2,587,477 | Hunter | Feb. 26, 1952 |
| 2,671,074 | Brown | Mar. 2, 1954 |
| 2,698,318 | Brown | Dec. 28, 1954 |
| 2,702,798 | Burleigh et al. | Feb. 22, 1955 |
| 2,710,292 | Brown | June 7, 1955 |
| 2,981,721 | Brown | Apr. 25, 1961 |